United States Patent
Koo et al.

(10) Patent No.: US 8,798,160 B2
(45) Date of Patent: Aug. 5, 2014

(54) METHOD AND APPARATUS FOR ADJUSTING PARALLAX IN THREE-DIMENSIONAL VIDEO

(75) Inventors: Jae-phil Koo, Seoul (KR); Dae-sik Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 648 days.

(21) Appl. No.: 12/941,318

(22) Filed: Nov. 8, 2010

(65) Prior Publication Data
US 2011/0109731 A1 May 12, 2011

Related U.S. Application Data

(60) Provisional application No. 61/258,668, filed on Nov. 6, 2009.

(30) Foreign Application Priority Data

Oct. 26, 2010 (KR) .......... 10-2010-0104750

(51) Int. Cl.
*H04N 13/00* (2006.01)

(52) U.S. Cl.
CPC ................ *H04N 13/0022* (2013.01)
USPC .................. 375/240.24; 348/51

(58) Field of Classification Search
CPC ................................. H04N 13/0022
USPC ................. 375/240–240.29; 348/42–60
See application file for complete search history.

(56) References Cited

U.S. PATENT DOCUMENTS

| | | | |
|---|---|---|---|
| 6,584,219 B1* | 6/2003 | Yamashita et al. | 382/154 |
| 2006/0050791 A1* | 3/2006 | Shiiyama | 375/240.24 |
| 2010/0053310 A1* | 3/2010 | Maxson et al. | 348/51 |

FOREIGN PATENT DOCUMENTS

KR   1020070040645 A   4/2007

OTHER PUBLICATIONS

Yuji Nojiri et. al., "Visual comfort/discomfort and visual fatigue caused by stereoscopic HDTV viewing", SPIE-IS&T Electronic Imaging, SPIE vol. 5291, pp. 303-313, 2004.

* cited by examiner

*Primary Examiner* — Christopher S Kelley
*Assistant Examiner* — Jonathan Messmore
(74) *Attorney, Agent, or Firm* — Sughrue Mion, PLLC

(57) ABSTRACT

A method and apparatus for adjusting parallax of a three-dimensional (3D) video are provided. The method including receiving an input of a 3D video sequence; determining whether a scene transition occurs between a previous frame and a current frame of the 3D video sequence; if it is determined that the scene transition occurs between the previous frame and the current frame, determining and comparing first depth information of a previous scene which includes the previous frame and second depth information of a current scene which includes the current frame; and, based on a result of the comparing, selectively adjusting depth information of at least one of the frames of the previous scene and the frames of the current scene in consideration of a difference between the first depth information and the second depth information.

20 Claims, 6 Drawing Sheets

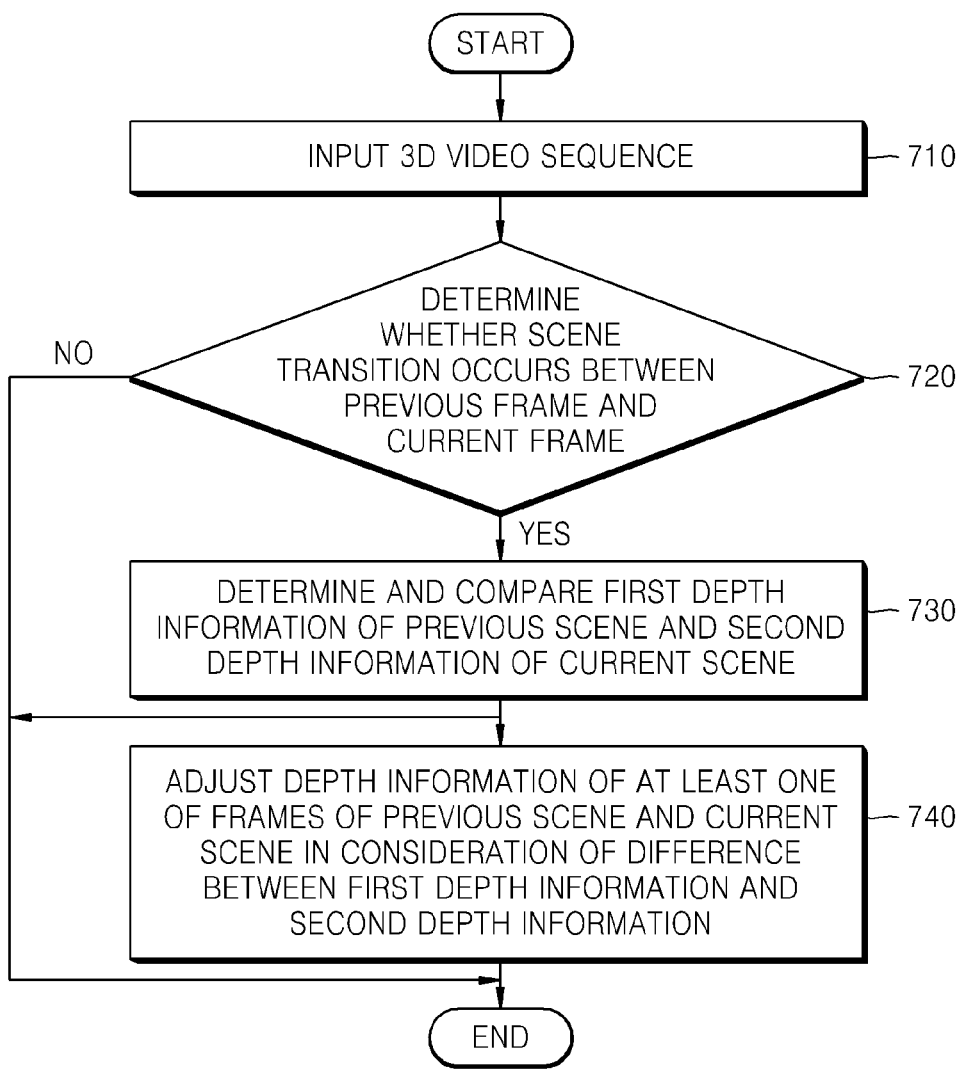

METHOD AND APPARATUS FOR ADJUSTING PARALLAX IN THREE-DIMENSIONAL VIDEO

CROSS-REFERENCE TO RELATED PATENT APPLICATION

This application claims priority from U.S. Provisional Application No. 61/258,668, filed on Nov. 6, 2009 in the U.S. Patent and Trademark Office, and Korean Patent Application No. 10-2010-0104750, filed on Oct. 26, 2010 in the Korean Intellectual Property Office, the disclosures of which are incorporated herein by reference in their entirety.

BACKGROUND

1. Field

Methods and apparatuses consistent with exemplary embodiments relate to playback of a three-dimensional (3D) video.

2. Description of the Related Art

Based on the mechanism whereby a human recognizes an object by using his or her two eyes, a stereoscopic image can be generated by using two lenses. When a stereoscopic image is reproduced by using a 3D display device, a viewer may recognize a 3D effect. A 3D display device may generate 3D effects, e.g., an object appears to move into a screen or out of the screen, by forming a binocular parallax by using two images, that is, a left-viewpoint image and a right-viewpoint image.

As 3D display devices are commercialized, a demand for more 3D contents increases. However, if a viewer views a 3D content for an extended period of time, the viewer may become distracted or experience fatigue due to an erroneous 3D effect caused by a misalignment of a location at which an image formed as lines of sight of two eyes of the viewer converge, and a focal length of two eyes of the viewer. Therefore, distributors and manufacturers of 3D display devices or 3D contents are continuously researching and developing means of minimizing viewer distraction due to erroneous 3D effects.

SUMMARY

According to an aspect of an exemplary embodiment, there is provided a method of adjusting parallax of a 3D video, the method including receiving an input of a 3D video sequence; determining whether a scene transition occurs between a previous frame and a current frame of the 3D video sequence; if it is determined that the scene transition occurs between the previous frame and the current frame, determining and comparing first depth information of a previous scene which includes the previous frame and second depth information of a current scene which includes the current frame; and, based on a result of the comparing the first depth information and the second depth information, selectively adjusting depth information of at least one of the frames of the previous scene and the frames of the current scene in consideration of a difference between the first depth information and the second depth information.

According to an aspect of another exemplary embodiment, there is provided an apparatus for adjusting parallax in a 3D video, the apparatus including a scene transition determining unit, which determines whether a scene transition occurs between a previous frame and a current frame of an input 3D video sequence; a depth information analyzing unit, which determines and compares first depth information of a previous scene which includes the previous frame and second depth information of a current scene which includes the current frame, if it is determined that the scene transition occurs between the previous frame and the current frame; a depth information adjusting unit, which, based on a result of the comparison of the first depth information and the second depth information, selectively adjusts depth information of at least one of a plurality of frames of the previous scene and a plurality of frames of the current scene in consideration of a difference between the first depth information and the second depth information; and an output unit, which outputs a 3D video sequence reconstructed based on a result of the determination of a scene transition and a result of the analysis of depth information.

According to an aspect of another exemplary embodiment, there is provided a computer readable recording medium having recorded thereon a computer program for implementing the method of adjusting parallax of a 3D video.

BRIEF DESCRIPTION OF THE DRAWINGS

The above and other aspects will become more apparent by describing in detail exemplary embodiments with reference to the attached drawings in which:

FIG. 7 is a flowchart of a method of adjusting parallax in a 3D video according to an exemplary embodiment.

DETAILED DESCRIPTION OF EXEMPLARY EMBODIMENTS

Hereinafter, detailed descriptions of adjustments of parallax of 3D video according to various exemplary embodiments will be given with reference to FIGS. 1 through 7.

Figure 1:
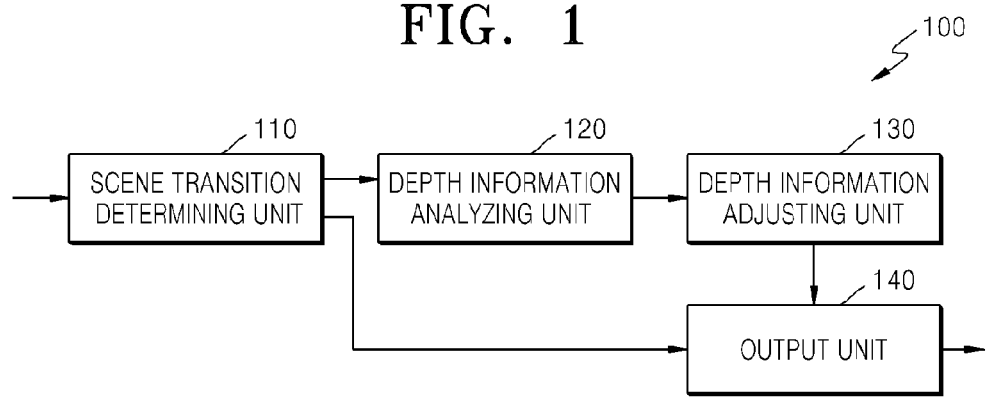
FIG. 1 is a block diagram of a 3D video parallax adjusting device according to an exemplary embodiment.

FIG. 1 is a block diagram of a 3D video parallax adjusting device 100 according to an exemplary embodiment.

The 3D video parallax adjusting device 100 includes a scene transition determining unit 110, a depth information analyzing unit 120, a depth information adjusting unit 130, and an output unit 140.

A 3D video sequence is input to the 3D video parallax adjusting device 100. A 3D video sequence may be formed of successive frames. According to an exemplary embodiment the present disclosure, a picture or a field may be also used as an image data unit. A video sequence is formed of a plurality of successive frames, so that a predetermined number of frames may be displayed per second. For example, if the frame display cycle of a video sequence is 60 Hz, the video sequence includes 60 frames per second.

Predetermined video content includes a plurality of scenes, and each of the scenes includes different image data. Therefore, at a time when a scene transition occurs, image data of a previous scene and image data of a current scene may be significantly different from each other.

The scene transition determining unit 110 determines whether a scene transition occurs between a previous frame and a current frame from among frames of the 3D video sequence input to the 3D video parallax adjusting device 100.

Although a frame is displayed for a fraction of a second, a scene is displayed for a longer period of time than a frame, and thus a scene may be formed of from dozens to thousands of frames. Therefore, a previous frame or a current frame is one of a plurality of frames constituting a predetermined scene. If image data of a previous frame and image data of a current frame are significantly different from each other, a previous scene, to which the previous frame belongs, and a current scene, to which the current frame belongs, may be analyzed as different scenes, and thus it may be determined that a scene transition has occurred.

The scene transition determining unit 110 may determine whether a scene transition has occurred between a previous scene and a current scene by comparing histograms of a previous frame and a current frame. For example, the scene transition determining unit 110 may determine a first histogram with respect to at least one of a left-viewpoint image and a right-viewpoint image of a previous frame and may determine a second histogram with respect to the left-viewpoint image and/or the right-viewpoint image of a current frame, that is, an image of the same viewpoint or viewpoints as the first histogram. The scene transition determining unit 110 may determine a correlation between the first histogram of a previous frame and the second histogram of a current frame. If the correlation between the first and second histograms is below a predetermined threshold value (i.e., a difference is large), it may be determined that the previous frame and the current frame are not likely to correspond to the same scene and thus it may be determined that a scene transition has occurred between the previous frame and the current frame. On the other hand, if the correlation between the first and second histograms is equal to or greater than the predetermined threshold value (i.e., a difference is small), it may be determined that the previous frame and the current frame are likely to correspond to the same scene and thus it may be determined that a scene transition has not occurred between the previous frame and the current frame.

If the scene transition determining unit 110 determines that no scene transition has occurred between a previous frame and a current frame, the previous frame and the current frame may be output to the output unit 140.

Since each scene of a video sequence includes different image data, each scene of a 3D video sequence may have different depth information. Therefore, if a scene is suddenly switched from a previous scene to a current scene, depth information may be changed significantly. The 3D video parallax adjusting device 100 determines whether depth information of successive scenes, which is a vital component of a 3D video, is significantly changed at a point of a scene transition.

Therefore, if the scene transition determining unit 110 determines that a scene transition has occurred, the depth information analyzing unit 120 determines depth information regarding a previous scene, to which a previous frame belongs, and depth information regarding a current scene, to which a current frame belongs, and compares the previous and the current depth information to each other.

In other words, the depth information analyzing unit 120 determines first depth information, which is a value representing depth information of a previous scene, and second depth information, which is a value representing depth information of a current scene and compares the first depth information and the second depth information, and thus a difference in depth information between the previous scene and the current scene may be determined and analyzed.

If depth information is changed significantly (e.g., if the change exceeds a threshold value) due to a scene transition between two successive frames, a viewer is more likely to experience fatigue due to a 3D effect. Therefore, the 3D video parallax adjusting device 100 may adjust depth information of a previous scene and a current scene to reduce a change in depth information due to a scene transition.

The depth information adjusting unit 130 selectively adjusts depth information of a previous frame of a previous scene and depth information of at least one of a predetermined number of successive frames which belongs to a current scene, based on a result of comparing depth information between the previous scene and the current scene. Here, a number of frames for adjusting depth information thereof may be variable. However, in the case of adjusting depth information of frames of the current scene, only frames of the current scene before the scene transition to a next scene may be selected for adjustment.

If a difference between first depth information regarding a previous scene and second depth information regarding a current scene exceeds a predetermined threshold value, the depth information adjusting unit 130 may adjust depth information of frames of the current scene in consideration of the first depth information of the previous scene. The frames of the current scene include a current frame.

Furthermore, if an operation of displaying a video sequence with adjusted parallax and an operation of adjusting parallax are not performed in real time, depth information of frames of a previous scene may be adjusted before the frames of the previous scene are displayed. In other words, if a difference between first depth information regarding a previous scene and second depth information regarding a current scene exceeds a predetermined threshold value, the depth information adjusting unit 130 may adjust depth information of frames of the previous scene in consideration of the second depth information of the current scene. The frames of the previous scene include a previous frame.

Therefore, if a difference between first depth information regarding a previous scene and second depth information regarding a current scene exceeds a predetermined threshold value, the depth information adjusting unit 130 may selectively adjust first depth information of frames of the previous scene and/or second depth information of frames of the current scene in consideration of a difference between the first depth information and the second depth information.

As a result, the depth information adjusting unit 130 may determine depth information with respect to predetermined frames from among frames of a previous scene and a current scene, such that depth information of a previous frame of the previous scene and depth information of each frame of the current scene gradually changes from the first depth information of the previous frame to the second depth information of the current frame. That is, multiple, gradual adjustments to the depth information can be made, starting at a previous frame and continuing to be made to successive current frames until the depth information of one of the current frames is equivalent to the second depth information.

If a difference between first depth information regarding a previous scene and second depth information regarding a current scene is below a predetermined threshold value, the depth information adjusting unit 130 may output corresponding frames to the output unit 140 without adjusting depth information of the previous scene and the current scene.

The depth information adjusting unit 130 may adjust depth information of at least one of a left-viewpoint image and a right-viewpoint image of a frame.

The output unit 140 outputs a 3D video sequence, which is reconstructed based on a result of scene transition determination performed by the scene transition determining unit 110 and a result of depth information comparison performed by the depth information adjusting unit 130. In detail, the output unit 140 reconstructs an output sequence to include frames as are input to the 3D video parallax adjusting device 100 with respect to frames that are determined by the scene transition determining unit 110 as frames including no scene transition. Furthermore, the output unit 140 reconstructs an output sequence to also include frames as they are input to the 3D video parallax adjusting device 100 with respect to frames that are determined by the scene transition determining unit 110 as frames including a scene transition, if a change of depth between scenes analyzed by the depth information analyzing unit 120 is less than a predetermined threshold value. However, the output unit 140 may reconstruct an output sequence to include frames of which the depth information is adjusted by the depth information adjusting unit 130 with respect to frames that are determined by the scene transition determining unit 110 as frames including a scene transition, if the change of depth between scenes analyzed by the depth information analyzing unit 120 is equal to or greater than the predetermined threshold value.

Depth information of a 3D video may include information regarding a depth value, a disparity, and binocular parallax. The 3D video parallax adjusting device 100 may use at least one of depth values, disparities, and binocular parallax between the left-viewpoint image and the right-viewpoint image of a 3D video to analyze depth information.

When depth information is changed significantly due to a scene transition in a 3D video, the 3D video parallax adjusting device 100 may adjust binocular parallax between a previous scene and a current scene, so that binocular parallax between a previous scene and a current scene may be gradually changed and a viewer may feel less fatigue due to a 3D effect.

Figure 2:
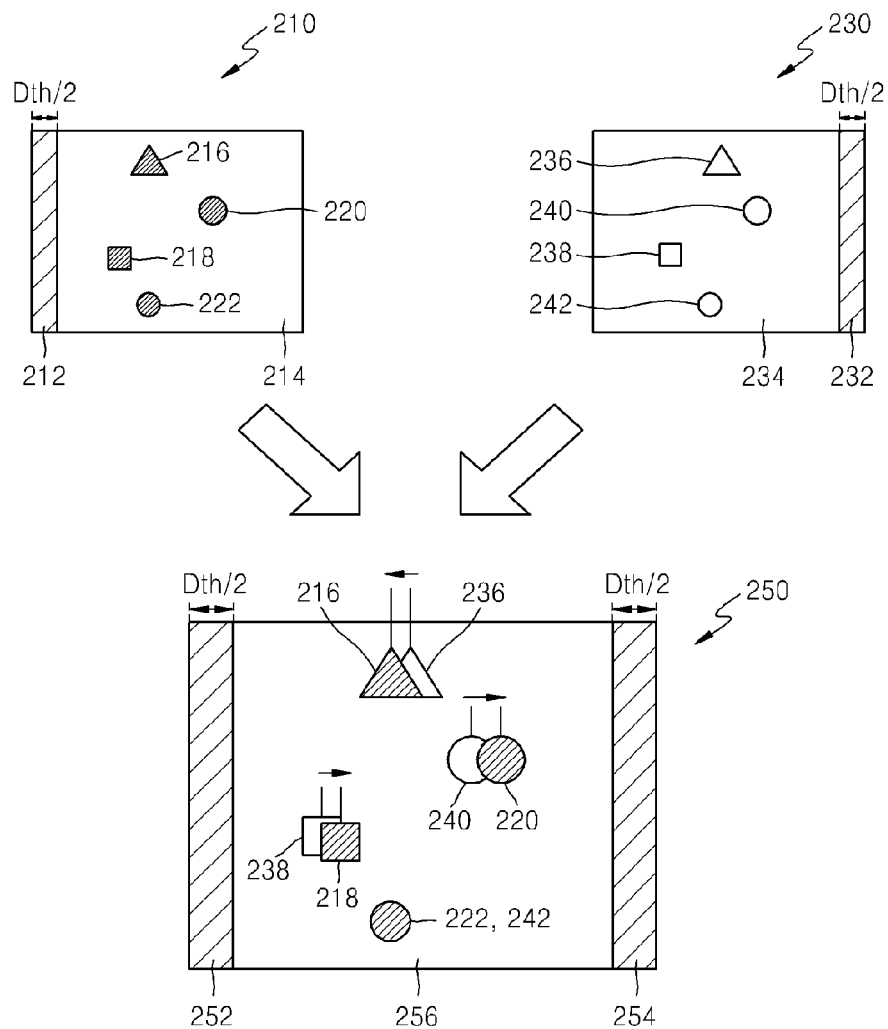
FIG. 2 is a diagram showing disparity of a 3D video according to an exemplary embodiment.

FIG. 2 is a diagram showing disparity of a 3D video.

A left-viewpoint image 210 and a right-viewpoint image 230 of a 3D video correspond to each other. To display only portions of the left-viewpoint image 210 and the right-viewpoint image 230 corresponding to each other, a left portion of the left-viewpoint image 210 is cropped by a width $D_{th}/2$, and a right portion of the right-viewpoint image 230 is cropped by a width $D_{th}/2$. Disparity of the 3D video may be determined by comparing a valid region 214, which is formed by cropping the left portion 212 from the left-viewpoint image 210, and a valid region 234, which is formed by cropping the right portion 232 from the right-viewpoint image 230.

The valid region 214 of the left-viewpoint image 210 includes a first left-viewpoint object 216, a second left-viewpoint object 218, a third left-viewpoint object 220, and a fourth left-viewpoint object 222, whereas the valid region 234 of the right-viewpoint image 230 includes a first right-viewpoint object 236, a second right-viewpoint object 238, a third right-viewpoint object 240, and a fourth right-viewpoint object 242.

As a result, in a 3D video screen 250, in which the left-viewpoint image 210 and the right-viewpoint image 230 are simultaneously displayed, the left-viewpoint image 210 and the right-viewpoint image 230 overlap each other, and a left region 252 corresponding to the left portion 212 of the left-viewpoint image 210 and a right region 254 corresponding to the right region 232 of the right-viewpoint image 230 are cropped. In a region 256 where the valid region 214 of the left-viewpoint image 210 and the valid region 234 of the right-viewpoint image 230 overlap each other, the first left-viewpoint object 216, the second left-viewpoint object 218, the third left-viewpoint object 220, the fourth left-viewpoint object 222, the first right-viewpoint object 236, the second right-viewpoint object 238, the third right-viewpoint object 240, and the fourth right-viewpoint object 242 may be displayed.

Here, a negative disparity is formed between the first left-viewpoint object 216 and the first right-viewpoint object 236, a positive disparity is formed between the second left-viewpoint object 218 and the second right-viewpoint object 238, and a positive disparity is formed between the third left-viewpoint object 220 and the third right-viewpoint object 240. A zero disparity is formed between the fourth left-viewpoint object 222 and the fourth right-viewpoint object 242.

In other words, depth information of a 3D video may be expressed as disparities for each of the objects between the left-viewpoint image and the right-viewpoint image, and there may be a positive disparity, a negative disparity, and a zero disparity. A disparity histogram indicating cumulative distribution of each of disparities of 3D content may be used for analyzing a 3D content.

Figure 3:
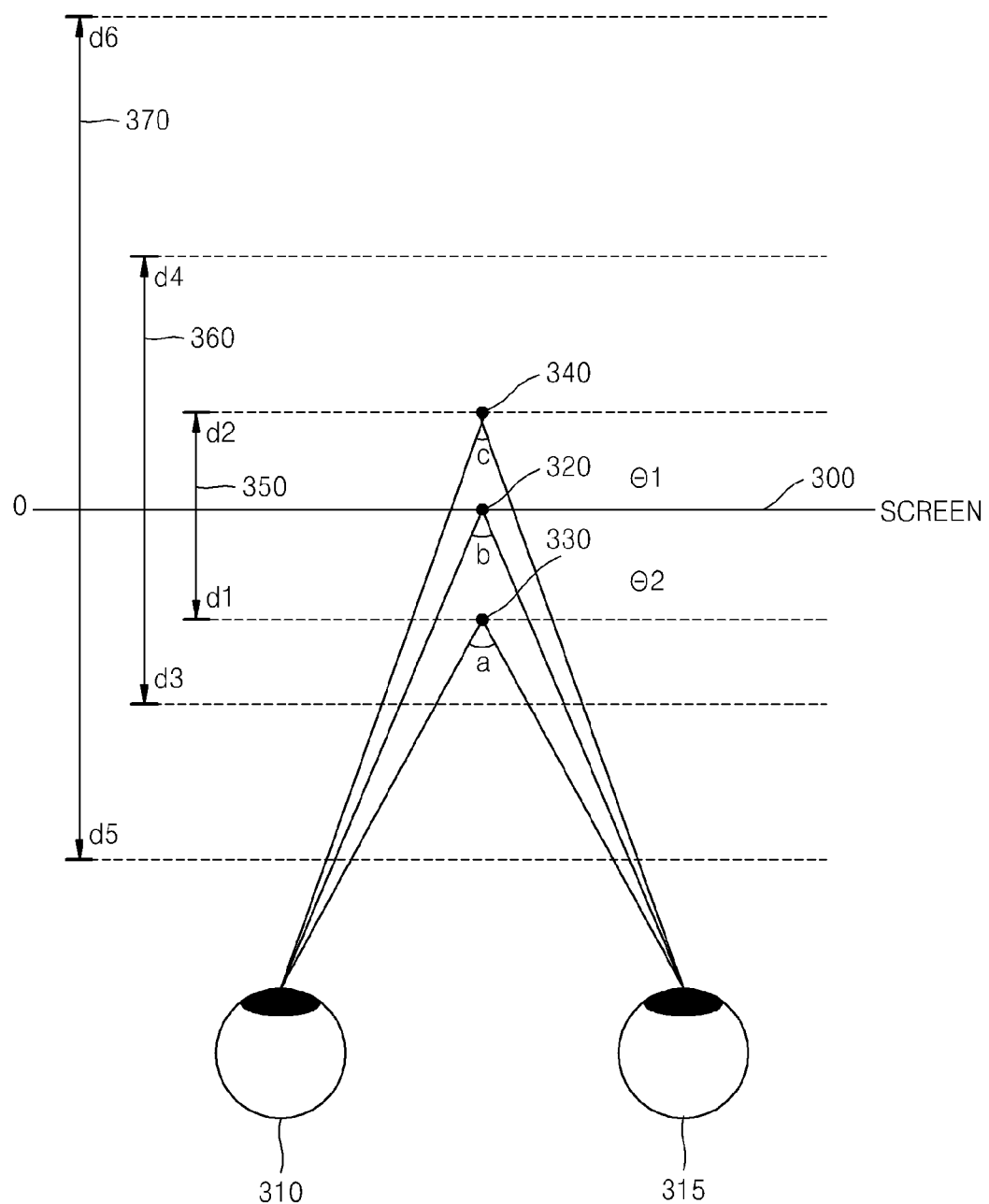
FIG. 3 is a diagram showing binocular parallax of a 3D video according to an exemplary embodiment.

FIG. 3 is a diagram showing binocular parallax of a 3D video.

Binocular parallax of a 3D video may be defined by using a convergence angle at a location at which lines of sight of two eyes 310 and 315 of a viewer converge. In particular, an angle b at which the lines of sight of the two eyes 310 and 315 converge to a location 320 on a screen 300 is referred to as an accommodation angle.

When the lines of sight of the two eyes 310 and 315 converge to a first location 340, which is behind the screen 300, a parallax angle $\theta_1$, which is a difference between a convergence angle c and an accommodation angle b with respect to the first location 340, that is, $\theta_1 = \theta_c - \theta_b$, is formed as binocular parallax. In the same regard, when the lines of sight of the two eyes 310 and 315 converge to a second location 330, which is in front of the screen 300, a parallax angle $\theta_2$, which is a difference between a convergence angle a and an accommodation angle b with respect to the second location 330, that is, $\theta_2 = \theta_a - \theta_b$, is formed as binocular parallax.

A first range 350, a second range 360, and a third range 370, which indicate distances from the screen 300, may indicate locations of convergence points at which a viewer may feel fatigue due to binocular parallaxes. For example, if the lines of sight of the two eyes 310 and 315 converge to a point within the first range 350 which extends from a point, which is located in front of the screen 300 toward a viewer by a distance d1, to a point, which is located behind the screen 300 away from a viewer by a distance d2, it is less likely that a viewer may experience fatigue due to binocular parallax.

If the lines of sight of the two eyes 310 and 315 converge to a point outside of the first range 350 but within the second range 360 extending from a point, which is located in front of the screen 300 toward a viewer by a distance d3, to a point, which is located behind the screen 300, away from a viewer by a distance d4, a viewer may experience fatigue due to binocular parallax.

If the lines of sight of the two eyes 310 and 315 converge to a point outside of the second range 360 but within the third range 370 extending from a point, which is located in front of the screen 300, toward a viewer by a distance d5, to a point, which is located behind the screen 300 away from a viewer by a distance d6, a viewer may experience extreme fatigue due to binocular parallax.

As described above, depth information of a 3D video may be expressed as binocular parallax between a left-viewpoint image and a right-viewpoint image. A direction of a convergence location of binocular parallax with respect to a screen may correspond to a positive or negative direction of a disparity of stereoscopic images. Binocular parallax and the disparity may be converted to each other in consideration of a resolution of a screen, a distance between two eyes, and a distance between the two eyes and the screen.

Figure 4:
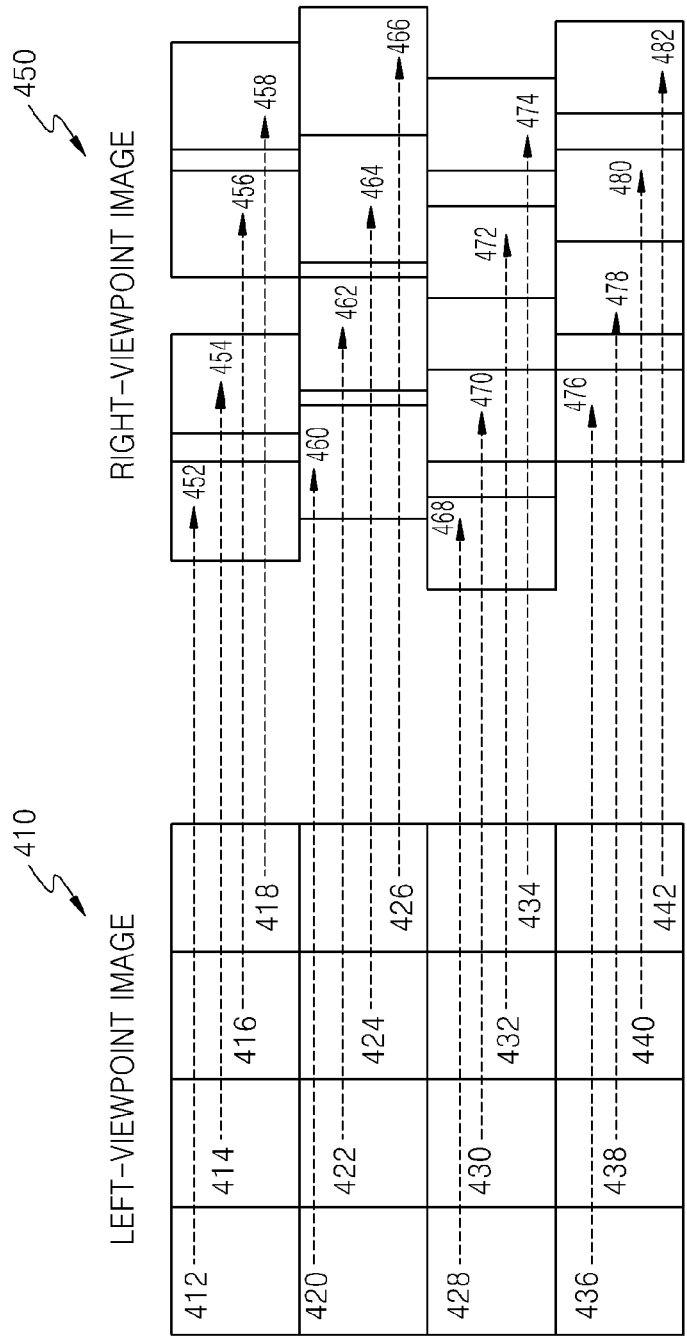
FIG. 4 is a diagram showing a method of detecting depth information of a 3D video according to an exemplary embodiment.

FIG. 4 is a diagram showing a method of detecting depth information of a 3D video according to an exemplary embodiment.

Depth information of a left-viewpoint image 410 and a right-viewpoint image 420 may be detected by using a block as the unit. For example, disparities may be detected between blocks 412, 414, 416, 418, 420, 422, 424, 426, 428, 430, 432, 434, 436, 438, 440, and 442 of the left-viewpoint image 410 and corresponding blocks 452, 454, 456, 458, 460, 462, 464, 466, 468, 470, 472, 474, 476, 478, 480, and 482 of the right-viewpoint image 450, respectively.

For example, disparity of the block 452 of the right-viewpoint image 450 may be detected based on the block 412 of the left-viewpoint image 410, disparity of the block 462 of the right-viewpoint image 450 may be detected based on the block 422 of the left-viewpoint image 410, disparity of the block 472 of the right-viewpoint image 450 may be detected based on the block 432 of the left-viewpoint image 410, and disparity of the block 482 of the right-viewpoint image 450 may be detected based on the block 442 of the left-viewpoint image 410.

The depth information analyzing unit 120 may determine disparities of each of the blocks between a left-viewpoint image and a right-viewpoint image of a previous frame and determine a disparity representing the disparities of each of the blocks of the previous frame as a first disparity of the previous frame. In the same regard, the depth information analyzing unit 120 may determine disparities of each of the blocks between a left-viewpoint image and a right-viewpoint image of a current frame and determine a disparity representing the disparities of each of the blocks of the previous frame as a second disparity of the current frame.

The depth information analyzing unit 120 may not only detect disparities, but also depth information with respect to each of the blocks in a frame. A value representing depth information of each of the blocks of a previous frame may be determined as first depth information, whereas a value representing depth information of each of the blocks of a current frame may be determined as second depth information. Furthermore, the value representing depth information may be either an arithmetic value, such as an average or a median value of the detected depth information or an expected value set up in consideration of the detected depth information.

As described above with reference to FIG. 4, the depth information analyzing unit 120 may determine a value representing depth information of each of the blocks within a frame as representative depth information of the corresponding frame. Furthermore, the depth information analyzing unit 120 may determine depth information for each of a plurality of frames corresponding to a predetermined scene and determine a value representing depth information of each of the frames as representative depth information of the corresponding scene. In other words, a value representing depth information for each of a plurality of frames corresponding to a previous scene may be determined as first depth information of the previous scene. Similarly, a value representing depth information for each of a plurality of frames corresponding to a current scene may be determined as second depth information of the current scene.

As a result, the depth information analyzing unit 120 may determine whether disparities are changed significantly due to a scene transition between a previous scene and a current scene by comparing first depth information of the previous scene and second depth information of the current scene.

Figure 5:
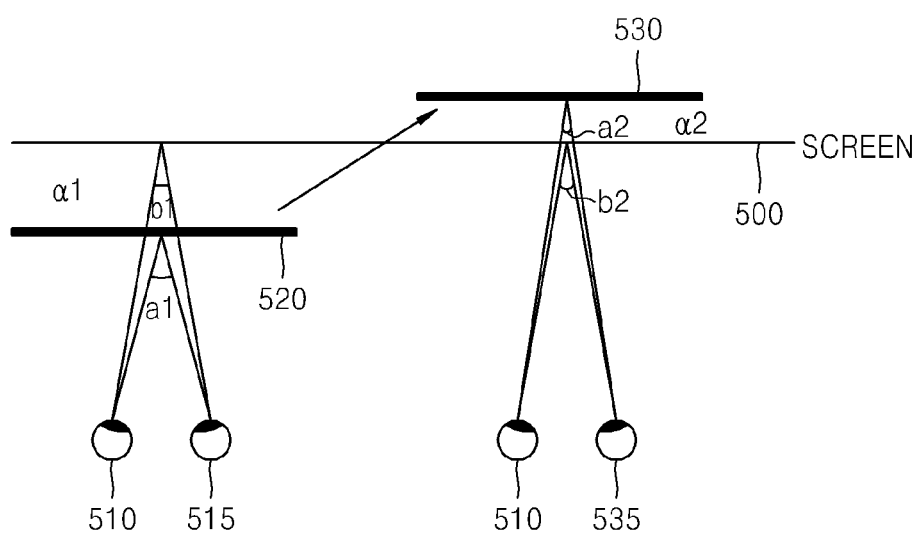
FIG. 5 is a diagram showing an example of a significant change in binocular parallax between a previous scene and a current scene of a 3D video.

FIG. 5 is a diagram showing that binocular parallax is changed significantly between a previous scene and a current scene of a 3D video.

A screen 520 of the previous scene is located in front of the screen 500 toward a viewer, and thus a parallax angle α1 is formed between a convergence angle a1 and an accommodation angle b1 ($\alpha1=\theta_{a1}-\theta_{b1}$) of a left eye 510 and a right eye 515. Furthermore, a screen 530 of the current scene is located behind the screen 500 away from a viewer, and thus a parallax angle α2 is formed between a convergence angle a2 and an accommodation angle b2 of the left eye 510 and a right eye 535 ($\alpha2=\theta_{a2}-\theta_{b2}$).

If the left eye 510 is a main viewpoint, it may be understood that only angles of the lines of sight of the right eyes 515 and 535 are changed with respect to the line of sight of the left eye 510. Therefore, as the parallax angle α1 of the screen 520 of the previous scene is changed significantly to the parallax angle α2 of the screen 530 of the current scene, significant binocular parallax is formed between the previous scene and the current scene, and thus the right eye 515 watching the previous scene corresponding to the screen 520 of the previous scene will be significantly turned to the right eye 535 to watch the current scene corresponding to the screen 530 of the current scene.

If a previous frame is a frame of a previous scene and a current frame is a frame of a current scene, a viewer may experience fatigue due to a 3D effect as it is switched from the previous frame to the current frame.

Figure 6:
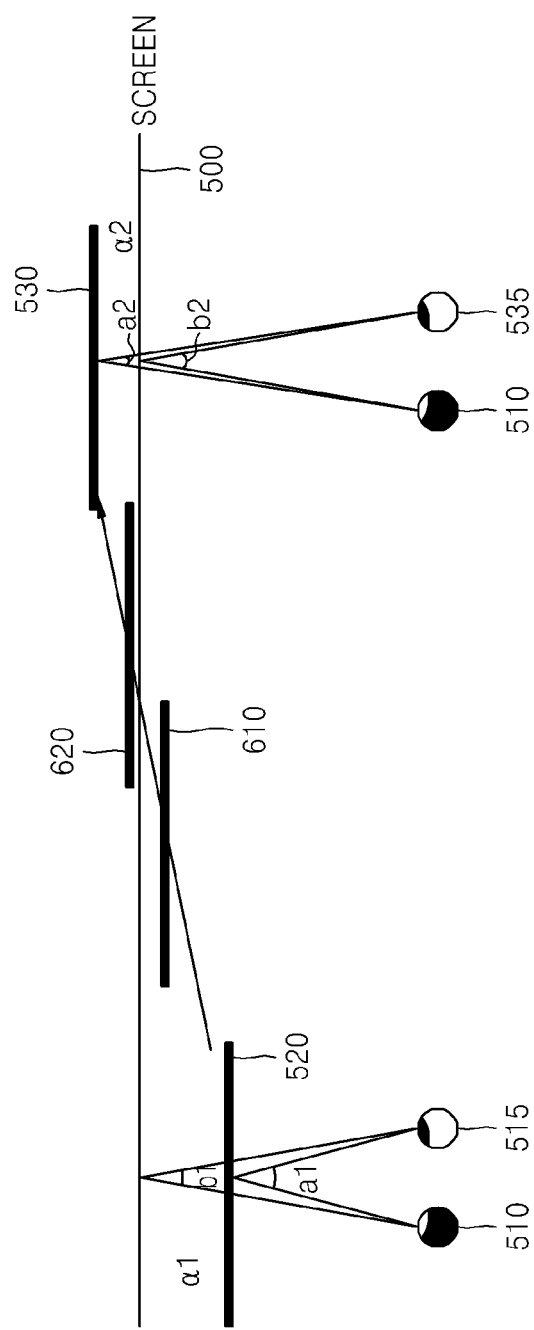
FIG. 6 is a diagram showing an example of adjusting parallax to ensure a smooth change of binocular parallax between a previous scene and a current scene in a 3D video according to an exemplary embodiment.

Therefore, the 3D video parallax adjusting device 100 is used to reduce fatigue experienced by a viewer due to a 3D effect, by adjusting depth information of frames, of which depth information is changed significantly at a scene transition, in consideration of a difference between depth information of a previous scene and a current scene. FIG. 6 is a diagram showing an example of adjusting parallax to ensure a smooth change of binocular parallax between a previous scene and a current scene in a 3D video.

As described above with reference to FIG. 5, if a difference between binocular parallax α1 of a previous scene and binocular parallax α2 of a current scene is significant, depth information of successive frames from among a predetermined number of frames constituting the current scene may be adjusted such that binocular parallaxes of each of the successive frames gradually changes from the parallax angle α1 of the previous scene to the parallax angle α2 of the current scene.

For convenience of explanation, a difference between a convergence angle and an accommodation angle is acquired by subtracting a smaller value from a larger value. The case in which a convergence angle is formed at a location in front of a screen 500 toward a viewer is referred to as positive binocular parallax, whereas the case in which a convergence angle is formed at a location behind the screen 500 away from a viewer is referred to as negative binocular parallax. Positive binocular parallax is indicated by using a positive number, whereas negative binocular parallax is indicated by using a negative number.

For example, it is assumed that a first frame 610 and a second frame 620 of a current frame chronologically exist between a previous frame of a previous scene and another current frame of a current scene. The depth information adjusting unit 130 may determine that binocular parallax β1 of the first frame 610 and binocular parallax β2 of the second frame 620 to be smaller than binocular parallax α1 of the previous scene and to be greater than binocular parallax α2 of the current scene (that is, α1>β1>β2>α2) in the chronological order.

Therefore, if depth information significantly increases from first depth information of a previous scene to second depth information of a current scene, the depth information adjusting unit 130 may adjust depth information of the frames of the current scene, such that depth information of a predetermined number of frames of the current scene monotonically and gradually increases from the first depth information to the second depth information in chronological order. Similarly, if depth information significantly decreases from the first depth information of the previous scene to the second depth information of the current scene, the depth information adjusting unit 130 may adjust depth information of the frames of the current scene, such that depth information of a predetermined number of frames of the current scene monotonically and gradually decreases from the first depth information to the second depth information in chronological order.

Although not shown in FIG. 6, if the 3D video parallax adjusting device 100 does not perform adjustment of parallax of a 3D video sequence in real time, depth information of frames of a previous scene may be adjusted before the frames of the previous scene are displayed. Therefore, in consideration of a difference between first depth information regarding a previous scene and second depth information regarding a current scene, depth information of at least one of frames of the previous scene and frames of the current scene may be selectively adjusted. The output unit 140 may generate an output video sequence for 3D display by reconstructing previous frames and current frames with or without adjusted depth information and may store or output the output video sequence.

FIG. 7 is a flowchart of a method of adjusting parallax in a 3D video according to an exemplary embodiment.

In operation 710, a 3D video sequence is input.

In operation 720, it is determined whether a scene transition occurs between a previous frame and a current frame in the input 3D video sequence. If it is determined that no scene transition occurs between the previous frame and the current frame in operation 720, the process for adjusting depth information with respect to the previous frame and the current frame is terminated.

If it is determined that a scene transition occurs between the previous frame and the current frame in operation 720, first depth information of a previous scene of the previous frame and second depth information of a current scene of the current frame are determined and compared in operation 730.

In operation 740, based on a result of the comparison, depth information of at least one of frames of the previous scene and frames of the current scene is selectively adjusted. As a result of comparing depth information of first depth information of the previous frame and the second depth information of the current frame, if a difference between the first depth information and the second depth information is not greater than a predetermined threshold value, the process for adjusting depth information with respect to the previous frame and the current frame is terminated.

If the difference between the first depth information and the second depth information is equal to or exceeds the predetermined threshold value, either depth information of the frames of the current scene or depth information of the frames of both of the previous scene and the current scene may be adjusted. In any of the exemplary embodiments of the present disclosure, binocular parallaxes of frames of the previous scene and the current scene may be adjusted to gradually change in chronological order, so that any significant difference between binocular parallaxes of the previous scene and the current scene may be minimized.

When the process for adjusting depth information with respect to the previous frame and the current frame is terminated, depth information is analyzed and adjusted with respect to the current frame and a next frame. Accordingly, depth information adjustment may be repetitively performed with respect to successive frames.

A viewer viewing 3D content with frequent scene transitions may feel discomfort due to significant changes of binocular parallaxes at scene transitions. As binocular parallaxes are adjusted to ensure smooth changes of binocular parallaxes at scene transitions by using a method of adjusting parallax in a 3D video according to an exemplary embodiment, a viewer may view 3D content with comfort.

The exemplary embodiments can be written as a computer program embodied on a computer readable recording medium and can be implemented in a general-use digital computer that executes the program using the computer readable recording medium. Examples of the computer readable recording medium include magnetic storage media (e.g., ROM, floppy disks, hard disks, etc.), optical recording media (e.g., CD-ROMs, DVDs, etc.), and other non-transitory recording mediums.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A method of adjusting parallax of a three-dimensional (3D) video, the method comprising:
 receiving an input of a 3D video sequence;
 determining whether a scene transition occurs between a previous frame and a current frame of the 3D video sequence;
 if it is determined that a scene transition occurs between the previous frame and the current frame, determining and comparing first depth information of a previous scene which comprises a first plurality of frames including the previous frame and second depth information of a current scene which comprises a second plurality of frames including the current frame; and
 based on a result of the comparing the first depth information and the second depth information, adjusting parallax between the previous scene and the current scene by selectively adjusting depth information of at least one of the first plurality of frames of the previous scene and the second plurality of frames of the current scene if a difference between the first depth information and the second depth information exceeds a predetermined threshold value.

2. The method of claim 1, wherein, if the difference between the first depth information and the second depth information exceeds the predetermined threshold value, the depth information of at least one of the second plurality of frames of the current scene is adjusted based on the first depth information of the previous scene.

3. The method of claim 1, wherein, if the difference between the first depth information and the second depth information exceeds the predetermined threshold value, the depth information of at least one of the first plurality of frames of the previous scene is adjusted based on the second depth information of the current scene.

4. The method of claim 1, wherein the adjusting the depth information comprises determining adjusted depth information for the previous frame of the previous scene and at least two consecutive frames of the second plurality of frames of the current scene, such that the adjusted depth information of the previous frame of the previous scene and the adjusted depth information of each of the consecutive frames of the current scene gradually changes from the first depth information to the second depth information in chronological order.

5. The method of claim 1, wherein the adjusting of the depth information comprises, if the difference between the first depth information and the second depth information is below the predetermined threshold value, outputting the first plurality of frames of the previous scene and the second plurality of frames of the current scene without adjusting the depth information of the second plurality of frames of the current scene.

6. The method of claim 1, wherein the determining whether the scene transition occurs comprises:
    determining a first histogram with respect to at least one of a left-viewpoint image and a right-viewpoint image of the previous frame;
    determining a second histogram with respect to an image of a same viewpoint as the first histogram among at least one of a left-viewpoint image and a right-viewpoint image of the current frame; and
    determining a correlation between the first histogram of the previous frame and the second histogram of the current frame,
    wherein, if the correlation between the first and second histograms is below a threshold value, determining that the scene transition does occur between the previous frame and the current frame.

7. The method of claim 1, wherein the comparing of the first depth information and the second depth information comprises:
    determining disparities of each of a plurality of blocks between a left-viewpoint image and a right-viewpoint of the previous frame and determining a value representing the disparities of each of the plurality of blocks of the previous frame as a first disparity of the previous frame;
    determining disparities of each of a plurality of blocks between a left-viewpoint image and a right-viewpoint of the current frame and determining a value representing the disparities of each of the plurality of blocks of the current frame as a second disparity of the current frame; and
    comparing the first disparity of the previous frame and the second disparity of the current frame.

8. The method of claim 1, wherein the depth information of the first plurality of frames of the previous scene and the second plurality of frames of the current scene comprises information regarding a depth value, a disparity, and binocular parallax.

9. The method of claim 1, wherein the adjusting of the depth information comprises:
    adjusting depth information of at least one of a left-viewpoint image and a right-viewpoint image of an adjusted frame corresponding to the adjusted depth information; and
    outputting the adjusted frame with the adjusted depth information.

10. An apparatus for adjusting parallax in a three-dimensional (3D) video, the apparatus comprising:
    a scene transition determining unit which determines whether a scene transition occurs between a previous frame and a current frame of an input 3D video sequence;
    a depth information analyzing unit which determines and compares first depth information of a previous scene which comprises a first plurality of frames including the previous frame and second depth information of a current scene which comprises a second plurality of frames including the current frame, if the scene transition unit determines that a scene transition occurs between the previous frame and the current frame;
    a depth information adjusting unit which, based on a result of the comparison of the first depth information and the second depth information by the depth information analyzing unit, adjusting parallax between the previous scene and the current scene by selectively adjusts depth information of at least one of the first plurality of frames of the previous scene and the second plurality of frames of the current scene if a difference between the first depth information and the second depth information exceeds a predetermined threshold value; and
    an output unit which outputs a 3D video sequence reconstructed based on a result of the determination of a scene transition and the result of the comparison of the first depth information and the second depth information.

11. The apparatus of claim 10, wherein, if the difference between the first depth information and the second depth information exceeds the predetermined threshold value, the depth information adjusting unit adjusts depth information of at least one of the second plurality of frames of the current scene based on the first depth information of the previous scene.

12. The apparatus of claim 10, wherein, if the difference between the first depth information and the second depth information exceeds the predetermined threshold value, the depth information adjusting unit adjusts depth information of at least one of the first plurality of frames of the previous scene based on the second depth information of the current scene.

13. The apparatus of claim 10, wherein the depth information adjusting unit determines adjusted depth information for the previous frame of the previous scene and at least two consecutive frames of the second plurality of frames of the current scene, such that adjusted depth information of the previous frame of the previous scene and the adjusted depth information of each of the consecutive frames of the current scene gradually changes from the first depth information to the second depth information in chronological order.

14. The apparatus of claim 10, wherein, if the difference between the first depth information and the second depth information is below the predetermined threshold value, the depth information adjusting unit outputs the first plurality of frames of the previous scene and the second plurality of frames of the current scene without adjusting the depth information of the second plurality of frames of the current scene.

15. The apparatus of claim 10, wherein the scene transition determining unit determines a first histogram with respect to at least one of a left-viewpoint image and a right-viewpoint image of the previous frame, determines a second histogram with respect to an image of a same viewpoint as the first histogram among a left-viewpoint image and a right-viewpoint image of the current frame, and determines a correlation between the first histogram of the previous frame and the second histogram of the current frame,
    wherein, if the correlation between the first and second histograms is below a predetermined correlation threshold value, the scene transition determining unit determines that the scene transition does occur between the previous frame and the current frame.

16. The apparatus of claim 10, wherein the depth information analyzing unit determines disparities of each of a plurality of blocks between a left-viewpoint image and a right-viewpoint of the previous frame and determines a value representing the disparities of each of the plurality of blocks of the previous frame as a first disparity of the previous frame, determines disparities of each of a plurality of blocks between a left-viewpoint image and a right-viewpoint of the current frame and determines a value representing the disparities of each of the plurality of blocks of the current frame as a second disparity of the current frame, and compares the first disparity of the previous frame and the second disparity of the current frame.

17. The apparatus of claim 10, wherein the depth information analyzing unit determines a value representing the depth information of the second plurality of frames of the current scene as the second depth information of the current scene.

18. The apparatus of claim 10, wherein the depth information of the first plurality of frames of the previous scene and the second plurality of frames of the current scene comprises information regarding a depth value, a disparity, and binocular parallax.

19. The apparatus of claim 10, wherein the depth information adjusting unit adjusts depth information of at least one of a left-viewpoint image and a right-viewpoint image of an adjusted frame corresponding to adjusted depth information and outputs the frames with the adjusted depth information.

20. A non-transitory computer readable recording medium having recorded thereon a computer program for executing a method of adjusting parallax of a three-dimensional (3D) video, the method comprising:

receiving an input of a 3D video sequence;

determining whether a scene transition occurs between a previous frame and a current frame of the 3D video sequence;

if it is determined that a scene transition occurs between the previous frame and the current frame, determining and comparing first depth information of a previous scene which comprises a first plurality of frames including the previous frame and second depth information of a current scene which comprises a second plurality of frames including the current frame; and based on a result of the comparing the first depth information and the second depth information, adjusting parallax between the previous scene and the current scene by selectively adjusting depth information of at least one of the first plurality of frames of the previous scene and the second plurality of frames of the current scene if a difference between the first depth information and the second depth information exceeds a predetermined threshold value.

* * * * *